(12) United States Patent
Ogawa (10) Patent No.: US 8,340,470 B2
(45) Date of Patent: *Dec. 25, 2012

(54) IMAGING APPARATUS, IMAGE EDITING METHOD AND PROGRAM

(75) Inventor: Katsunori Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/231,068

(22) Filed: Sep. 13, 2011

(65) Prior Publication Data

US 2012/0002072 A1 Jan. 5, 2012

Related U.S. Application Data (63) Continuation of application No. 12/021,532, filed on Jan. 29, 2008, now Pat. No. 8,031,974.

(30) Foreign Application Priority Data

Jan. 29, 2007 (JP) ................. 2007-018371

(51) Int. Cl.
*G06K 9/32* (2006.01)
*H04N 5/228* (2006.01)
(52) U.S. Cl. ..................... 382/298; 348/222.1
(58) Field of Classification Search .......... 382/298, 382/276, 282, 291, 293, 309
See application file for complete search history.

(56) References Cited

U.S. PATENT DOCUMENTS 5,666,471 A 9/1997 Fujii
2002/0118964 A1 8/2002 Enomoto
2003/0156197 A1 8/2003 Watanabe et al.
2005/0275732 A1 12/2005 Takeuchi

FOREIGN PATENT DOCUMENTS

| CN | 1442996 A | 9/2003 |
| JP | 3-25662 | 2/1991 |
| JP | 2001-211417 | 8/2001 |
| JP | 2003-244631 | 8/2003 |
| JP | 2004-172655 | 6/2004 |
| JP | 2005-124211 | 5/2005 |
| JP | 2005-318561 | 11/2005 |
| JP | 2006-5477 | 1/2006 |
| JP | 2006-74558 | 3/2006 |
| JP | 2006-115044 | 4/2006 |

OTHER PUBLICATIONS

Office Action issued Oct. 5, 2010 in JP Application No. 2009-6964.
Office Action issued Oct. 11, 2011 in Japan Appliation No. 2009-112997.

*Primary Examiner* — Yon Couso
(74) *Attorney, Agent, or Firm* — Oblon, Spivak, McClelland, Maier & Neustadt, L.L.P.

(57) ABSTRACT

An imaging apparatus includes: an imaging device; a first storage section storing image data including an image obtained by the imaging device; a display section displaying the image data stored in the first storage section; an image-effect specification section specifying a type of image effect to be produced on the image data displayed in the display section; a scaling operation section capable of specifying expansion and contraction of the image data displayed in the display section and specifying a range of an image edit area on the displayed image data; and an image processing section performing image processing on the image edit area specified by the scaling operation section in accordance with the specification from the image-effect specification section.

14 Claims, 9 Drawing Sheets

IMAGING APPARATUS, IMAGE EDITING METHOD AND PROGRAM

CROSS REFERENCES TO RELATED APPLICATIONS

This application is a continuation of U.S. application Ser. No. 12/021,532 filed Jan. 29, 2008, and is based upon and claims the benefit of priority from the prior Japanese Patent Application JP 2007-018371 filed in the Japanese Patent Office on Jan. 29, 2007, the entire contents of each of which are incorporated herein by reference.

BACKGROUND OF THE INVENTION

1. Field of the Invention

The present invention relates to an imaging apparatus, image editing method and program. More particularly, the present invention relates to an imaging apparatus, image editing method and program suitable for editing a captured image on a monitor of an imaging apparatus main unit.

2. Description of the Related Art

To date, for a method of printing an image captured by a digital still camera, methods using DPOF (Digital Print Order Format), PictBridge, etc., have been known. In these formats, a plurality of images are simply allocated to a predetermined positions, and printing is performed using a printer connected to the digital still camera. However, it has not been possible to create an image having a layout that is desired by a user.

Accordingly, a proposal has been made of an imaging apparatus capable of easily performing editing in order to arrange captured images in a desired layout singly by a digital camera (for example, refer to Japanese Unexamined Patent Application Publication No. 2006-115044).

SUMMARY OF THE INVENTION

For parameters to be used for edit processing, it is necessary to set a type of edit processing, to set a degree (also called strength, a level, etc.) of the edit processing, to set a position of the target range for the edit processing, to set the size of the range, and the like. In general, operations are performed using a cross key, including for example, the description of Japanese Unexamined Patent Application Publication No. 2006-115044. There are many operation steps, and the operations are complicated and difficult to understand.

The present invention has been made in view of these points. It is desirable to provide an imaging apparatus having user-friendliness for a user using zoom keys disposed on the imaging apparatus.

According to an embodiment of the present invention, there is provided an imaging apparatus including: an imaging device; a first storage section storing image data including an image obtained by the imaging device; a display section displaying the image data stored in the first storage section; an image-effect specification section specifying a type of image effect to be produced on the image data displayed in the display section; a scaling operation section capable of specifying expansion and contraction of the image data displayed in the display section and specifying a range of an image edit area on the displayed image data; and an image processing section performing image processing on the image edit area specified by the scaling operation section in accordance with the specification from the image-effect specification section.

With the above-described configuration, a range of an image edit area on image data is specified by a scaling section provided in an imaging apparatus main unit, and thus it is possible to provide operationality which is intuitive and very easy to understand for the user.

By the present invention, it is possible to achieve user-friendliness for the user who edits images using an imaging apparatus.

DESCRIPTION OF THE PREFERRED EMBODIMENTS

In the following, a description will be given of an embodiment of the present invention with reference to the drawings.

Figure 1:
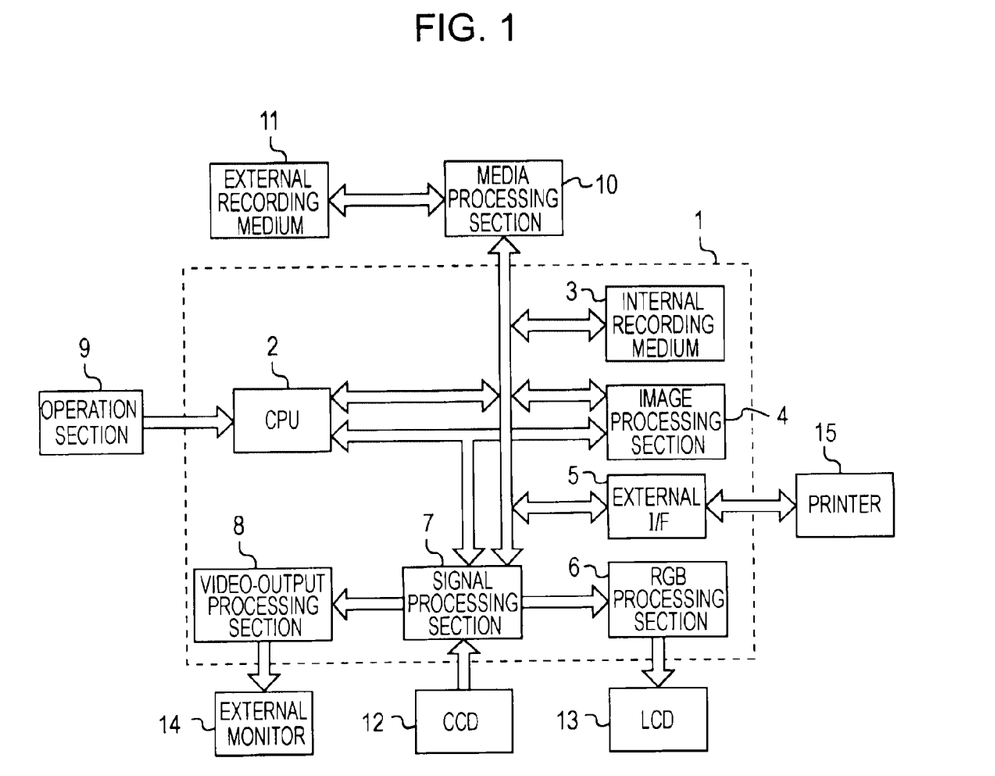
FIG. 1 illustrates an example of a block configuration of an imaging apparatus according to an embodiment of the present invention.

FIG. 1 illustrates an example of a configuration of a digital still camera, namely an imaging apparatus, according to an embodiment of the present invention. The present embodiment conforms to the standard of a current typical digital camera determined as the standard of Japan Electronics and Information Technology industries Association (JEITA).

That is to say, the present embodiment conforms to the standard of the file system of DCF (Design rule for Camera File System), and conforms to the standard of the file format of Exif (Exchangeable image file format for digital still camera). In the JPEG (joint Photographic Expert Group) file format, an area called an application marker segment is defined for storing application specific information. In the Exif format, information specific to Exif is stored in this area.

In FIG. 1, a processing section 1 surrounded by a dashed line is a portion controlled by a CPU (Central Processing Unit) 2. This processing section 1 includes an internal recording medium 3 (main storage unit), such as a RAM (Random Access Memory), etc., an image processing section 4, an external interface 5, an RGB processing section 6, a signal processing section 7, and a video-output processing section 8. The CPU 2 includes a ROM (Read Only Memory) not shown in the figure, and performs control and operation in accordance with various programs, such as an image editing program, etc., recorded in the ROM using the internal recording medium 3 as a work area. An operation section 9 is connected to the CPU 2 through an interface (omitted to be shown in the figure), and a signal corresponding to the operation of a shutter button, etc., disposed in the operation section 9 is supplied to the CPU 2.

Furthermore, data produced by compressing an imaging signal by JPEG (Joint Photographic Experts Group), etc., is recorded onto an external recording medium 11 (external storage unit) through a media processing section 10. For the external recording medium 11, a removable recording medium, such as a writable optical disc, a memory card, etc., or an internal nonvolatile memory of the imaging apparatus main unit, such as a flash memory or a hard disk is used.

An imaging signal from a CCD (Charge Coupled Device) 12 as an imaging device is supplied to the signal processing section 7, and imaging signal processing is performed. Regardless of whether there is input from the operation section 9, an image signal captured by the CCD 12 is output from the signal processing section 7, and is stored in the internal recording medium 3. During shooting, images in the internal recording medium 3 is constantly updated. Writing data onto and reading data from the internal recording medium 3, etc., are controlled by the CPU 2.

The imaging signal from the internal recording medium 3 is supplied to the RGB processing section 6 through the signal processing section 7, and a display signal formed by the RGB processing section 6 is supplied to an LCD (Liquid Crystal Display) 13, which is a display unit (display section). The LCD 13 is, for example disposed on the back face of the camera main unit. The LCD 13 displays not only the imaging signal, but also an image signal imported from the external recording medium 11 through a media processing section 10.

When the shutter button of the operation section 9 is pressed, an imaging signal taken in the internal recording medium 3 is converted into an image file, such as JPEG, etc., by the image processing section 4. The image file is stored as another data from the imaging signal in the internal recording medium 3. The image file read from the internal recording medium 3 is stored into the external recording medium 11 through the media processing section 10 under the control of the CPU 2.

An updated reproduced image is constantly display on the LCD 13. OSD data, such as a contracted image of recorded image data, software keys, such as icons, etc., are superimposed on the reproduced image by the signal processing section 7 and are displayed on the LCD 13. The OSD (On Screen Display) is a general term which means a memory area for preparing data, such as icons, etc., to be displayed by being superimposed on a real-time image taken from the CCD 12 of a digital still camera, and a mechanism thereof.

When OSD data is created, the latest image data already recorded on the external recording medium 11 is obtained, is converted into a size suitable for an OSD display by the image processing section 4, and then is stored into the OSD display area of the internal recording medium 3. However, when there is an image captured immediately before and having a size suitable for the OSD display of the image in the internal recording medium 3, it is not necessary to obtain the data from the external recording medium 11. The image processing section 4 functions as an image processing section, and is controlled by the CPU 2 such that the scaling processing of the image to be displayed and image editing/processing are performed in response to the operation of the key, etc., by the user in the operation section 9.

An analog color-video signal is output from a video output terminal, not shown in the figure, of the video-output processing section 8. When an external monitor 14 is connected to the video output terminal, it is possible to display an image stored in the internal recording medium 3 or the external recording medium 11 onto the external monitor 14. Furthermore, for example, a printer 15 is connected to the external interface 5, thereby making it possible to print the image.

Figure 2:
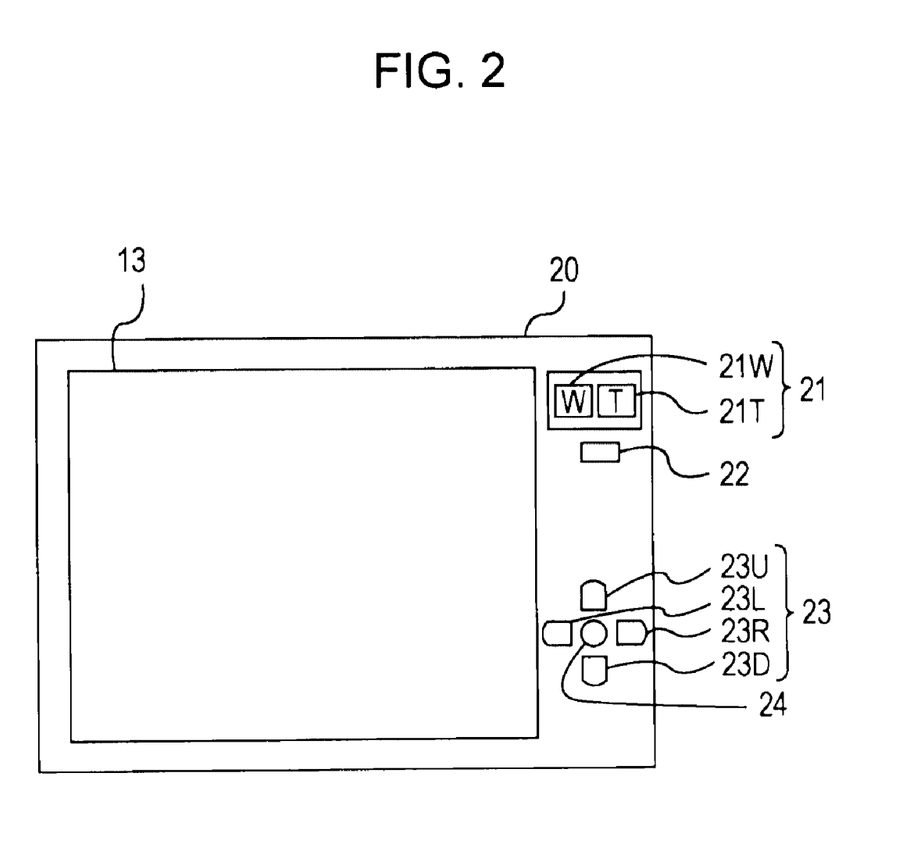
FIG. 2 illustrates an example of an operation panel of an imaging apparatus according to an embodiment of the present invention.

The operation section 9 includes a shutter button, zoom keys, a cross key, etc. FIG. 2 illustrates an example of an operation panel of a digital still camera 20, which is an imaging apparatus according to an embodiment of the present invention. In FIG. 2, together with a display screen of the LCD 13, zoom keys 21 (expansion and contraction operation section), a menu key 22, a cross key 23 (image-effect specification section and edit-area position specification section) and a decision key 24 are disposed on a face of the digital still camera 20.

The zoom keys 21 adjust digital zooming and optical zooming at shooting time. When the zoom keys 21 function as adjustment keys of the digital zooming, it is possible to change the expansion display or the contraction display of an image captured by the CCD 12 and displayed on the LCD 13 by operating a wide (wide-angle) key 21W or a tele (telescopic) key 21T. Also, when the zoom keys 21 function as optical zooming, it is possible to change a focal distance between the CCD 12 and a lens not shown in the figure to change telescopic and wide angle in order to change the expansion and contraction of an image projected on the CCD 12 by operating the wide (wide-angle) key 21W or the tele (telescopic) key 21T. Furthermore, it is possible to specify the range of the image edit area to be subjected to an image effect on the image displayed on the LCD 13 by the wide key 21W or the tele key 21T.

The cross key 23 includes direction instruction keys instructing the movement direction of a cursor displayed on the LCD 13 to any one of an up, down, right or left direction by pressing each end part (individually called an up key 23U, a down key 23D, a left key 23L, and a right key 23R) of the cross-shaped operation key. Using the functions as a direction instruction key of this cross key 23, it is possible to specify the position of an image edit area on the image data, to specify the type of image effect on the image edit area specified by the above-described zoom keys 21, to adjust the strength of the effect, and the like. In this regard, for a direction instruction key, it is possible to use an input device, such as a dial, a roller, a track ball, a touch panel, etc. Also, the operation section 9 is not limited to a mechanical configuration, and a GUI (Graphical User Interface) for operating buttons, etc., displayed on a display screen by icons may be used.

The menu key 22 is used when various menu items, for example, the type of image effect described below, the strength of the effect, etc., are displayed. Also, a decision key 24 (storage instruction section) is used as a trigger key for starting certain processing, and used for selecting one of the options when options are displayed.

In the Exif file format, additional information of Exif IFD is defined. The additional information of the Exif IFD includes a tag on a shooting date and time, a shooting place, the configuration of image data, etc. Information on a shooting place can be obtained by positional information acquisition techniques, etc., using services provided by cellular phone companies, such as the GPS (Global Positioning System) function and Open i-area (a registered trademark). The obtained positional information is stored in the internal recording medium 3 or the external recording medium 11. The additional information of an image stored in the internal recording medium 3 or the external recording medium 11 is included in an image file by the Exif file format.

Next, a description will be given of editing processing of the present embodiment with reference to an editing processing flowchart in FIG. 3 and FIGS. 4 to 11.

Figure 3:
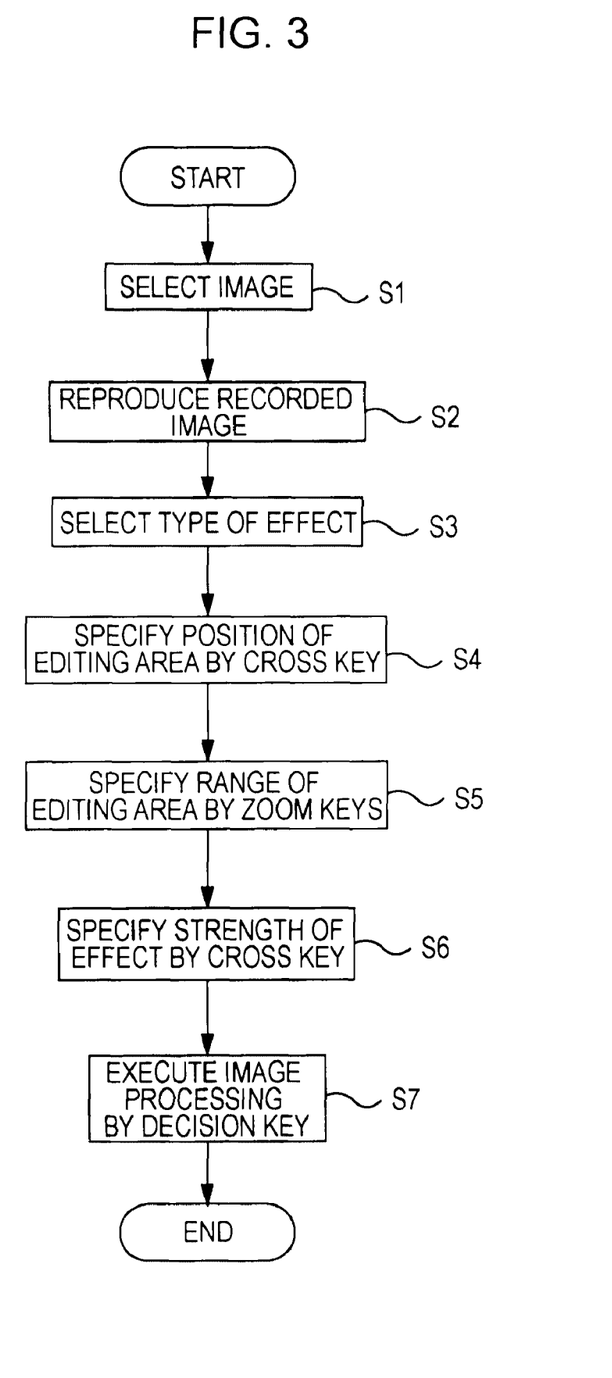
FIG. 3 is a flowchart illustrating edit processing according to an embodiment of the present invention.
Figure 4:
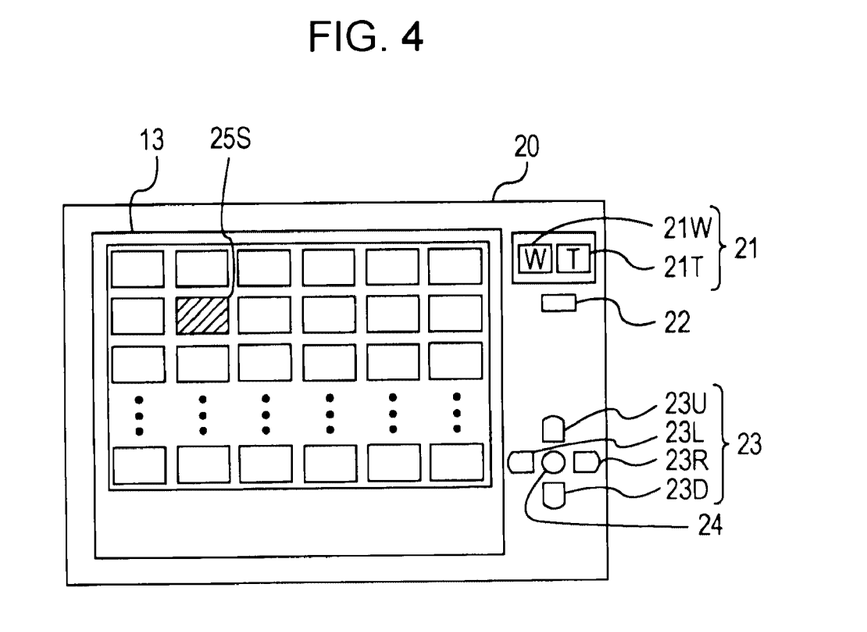
FIG. 4 illustrates an example of a screen for selecting an edit image according to an embodiment of the present invention.

In FIG. 3, the user first selects an "image effect" menu (omitted to be shown in the figure) by operating the menu key 22 and the cross key 23, etc., in order to select an image to be subjected to the image effect (step S1). In the present embodiment, it is possible to select either of an image immediately after shooting or an image recorded in the external recording medium 11. In an example shown in FIG. 4, a plurality of thumbnail images are displayed on the LCD 13, and the user selects a thumbnail image 25S out of the thumbnails by operating the cross key 23 and the decision key 24.

Figure 5:
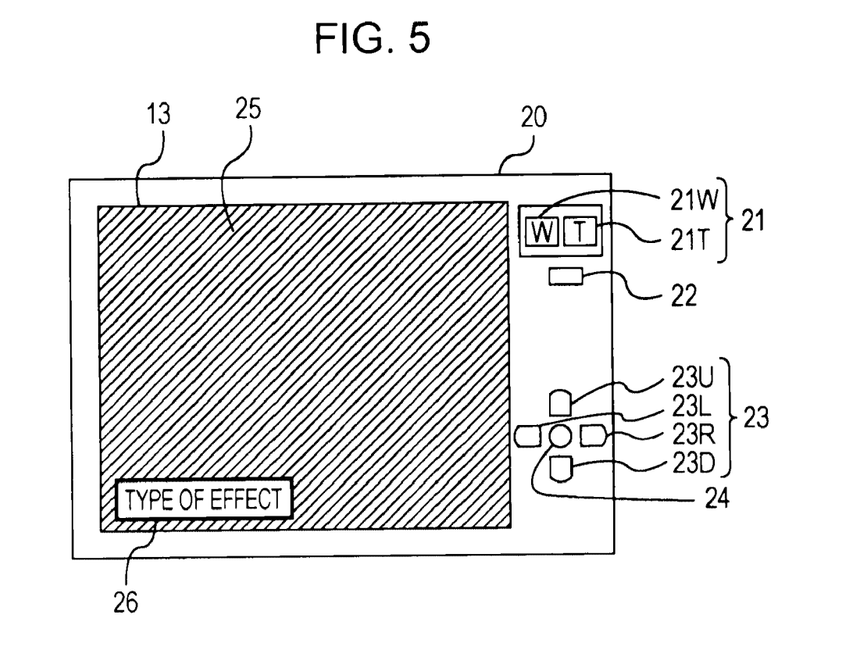
FIG. 5 illustrates a display example of an icon indicating a type of image effect according to an embodiment of the present invention.

As shown in FIG. 5, the CPU 2 displays the enlarged image 25 of the thumbnail image 25S on the full screen of the LCD 13 (step S2). Here, an icon 26 for selecting a "type of effect" on the image 25. Of course, a list of thumbnail images may not be displayed. Alternatively, images may be displayed one by one on the LCD 13, and when a desired image is displayed, the user may press the decision key 24 for a selection using the cross key 23.

Figure 6:
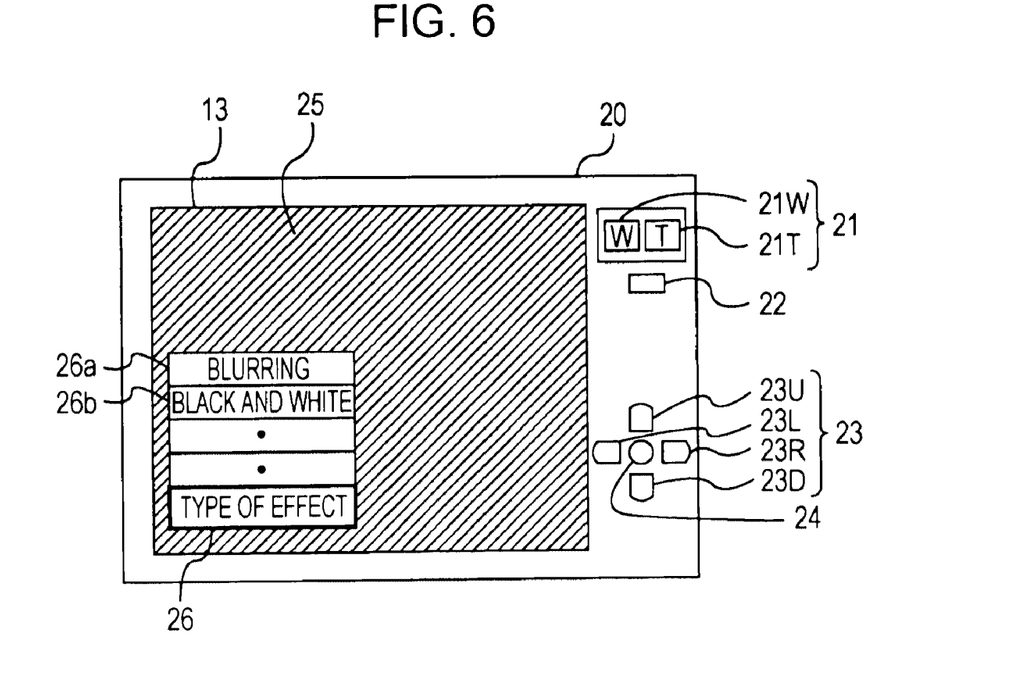
FIG. 6 illustrates an example of a screen for selecting a type of effect according to an embodiment of the present invention.

Next, when the user moves the cursor on the icon 26 of "type of effect" by operating the cross key 23, and presses the icon 26 of "type of effect", a list of image effects are displayed in a format like a drop-down menu. The user selects a desired image effect from the displayed items (step S3). FIG. 6 illustrates an example of a screen for selecting a type of effect. For a type of effect, for example, various image effects, such as mosaic, etc., can be adopted in addition to blurring 26a, and black and white 26b.

Figure 7:
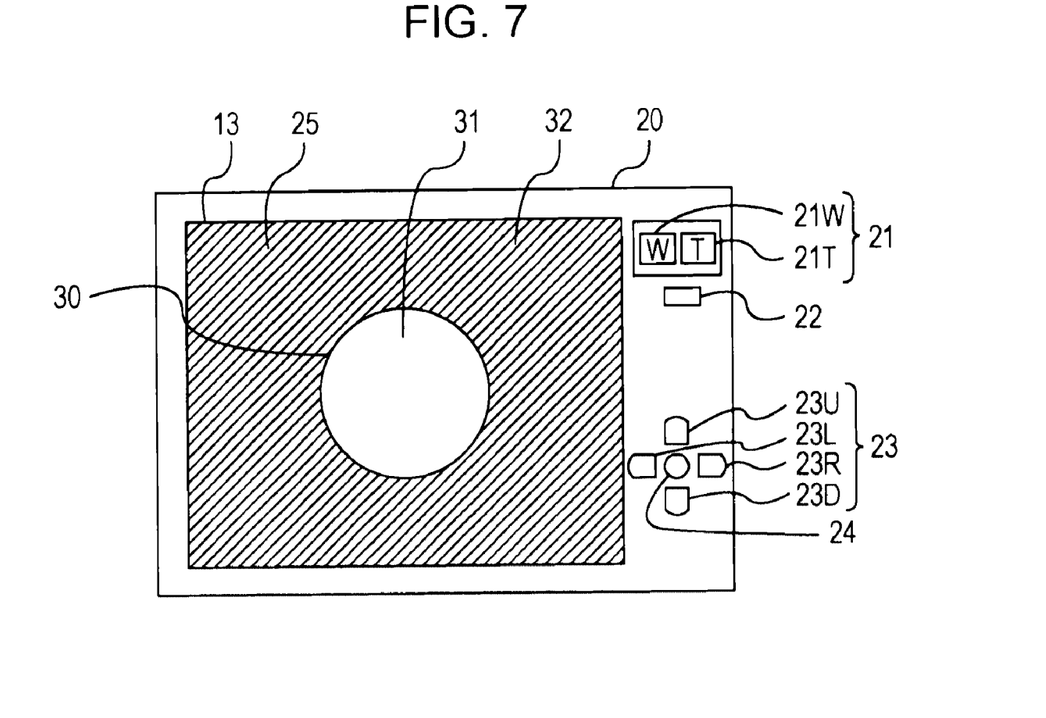
FIG. 7 illustrates a display example of an image editing screen according to an embodiment of the present invention.

The CPU 2 detects the image effect selected by the user, and, as shown in FIG. 7, displays a frame 30 indicating an image editing area 31 by being superimposed on the image 25 of the LCD 13. First, the user specified the position of the image editing area 31, that is to say, which part of the image 25 is to be edited by operating each key of the cross key 23 (step S4). If the position of the image editing area 31 is set in advance, for example if the image editing area is fixed in the center of the screen, the processing of step S4 is omitted.

Figure 8:
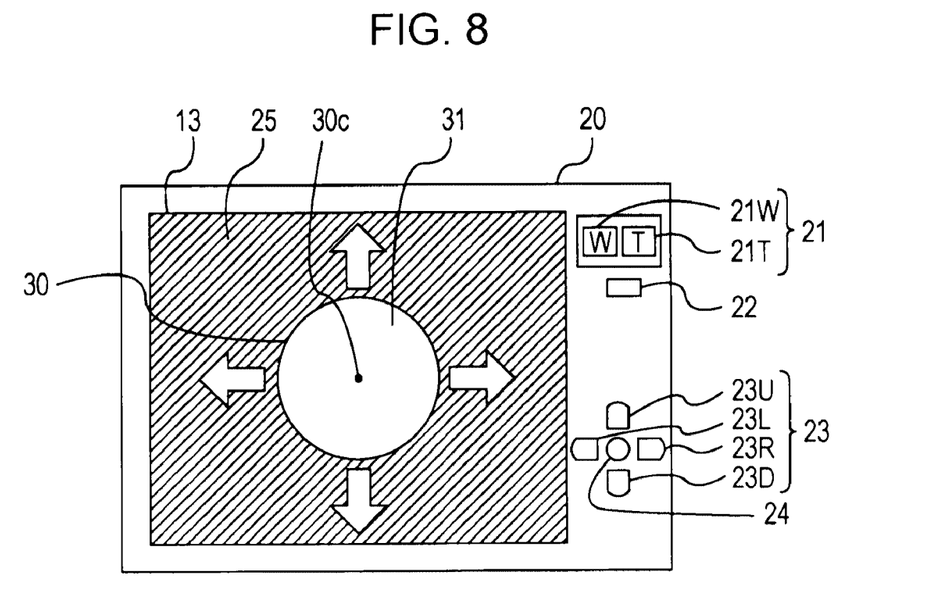
FIG. 8 illustrates an example of a screen for specifying a position of an image editing area according to an embodiment of the present invention.

FIG. 8 illustrates an example of a screen for specifying the position of an image editing area 31. For example, if the left key 23L of the cross key 23 is pressed, the image editing area 31 is moved to the left. Furthermore, if the up key 23U of the cross key 23 is pressed, the image editing area 31 is moved upward. The position of the image editing area 31 is obtained, for example by detecting the pixel coordinates of a central point 30c on the screen of the frame 30 forming the image editing area 31. The image editing area 31 surrounded by the frame 30 is subjected to the image effect selected in the processing of the above-described step S3. The image processing is not performed on a surrounding image non-editing area 32. In this regard, in this example, the frame 30 is set to be a circle, but the shape is not limited to this. Various shapes, such as an oval, a triangle, etc., may be used.

In the example shown in FIG. 8, the position of the image editing area is determined on the basis of the position of the central point 30c of the circular frame 30. However, the reference of the position of the image editing area 31 may be the top of the frame 30, or may be a central point or a corner of a polygonal frame. In this regard, the central point 30c of the frame 30 is displayed in FIG. 8, but may not be displayed in the actual image in terms of easiness of viewing the image.

Figure 9:
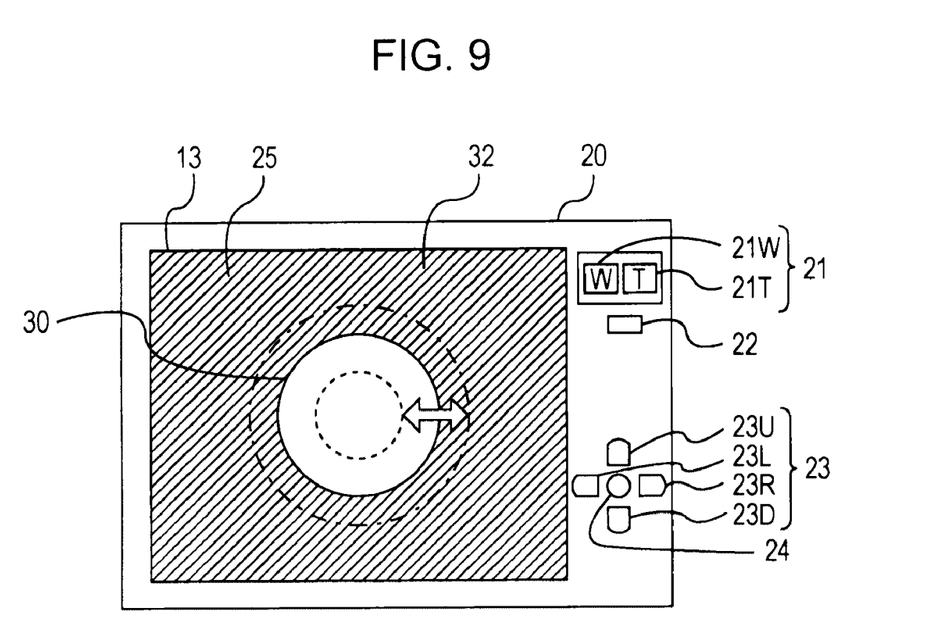
FIG. 9 illustrates an example of a screen for specifying a size of an image editing area according to an embodiment of the present invention.

Next, the size of the image editing area is specified. FIG. 9 illustrates an example of a screen for specifying the size (range) of the image editing area 30. The size of the frame 30 is specified as an arbitrary size by operating the zoom keys 21 (step S5). For example, if the tele key 21T of the zoom keys 21 is pressed, the diameter of the frame 30 increases, and if the wide key 21W is pressed, the diameter of the frame 30 decreases. The specification of the size of the image editing area 31 becomes intuitive and a very easy operation using the zoom keys 21 in this manner.

The range of the image editing area 31 is determined, for example by continuing to press the zoom keys 21 and by releasing the zoom keys 21 at the point in time when the frame 30 becomes a desired size. Alternatively, the range may be determined by the frame 30 becoming larger (smaller) by one step by pressing the zoom keys 21 each time.

Figure 10:
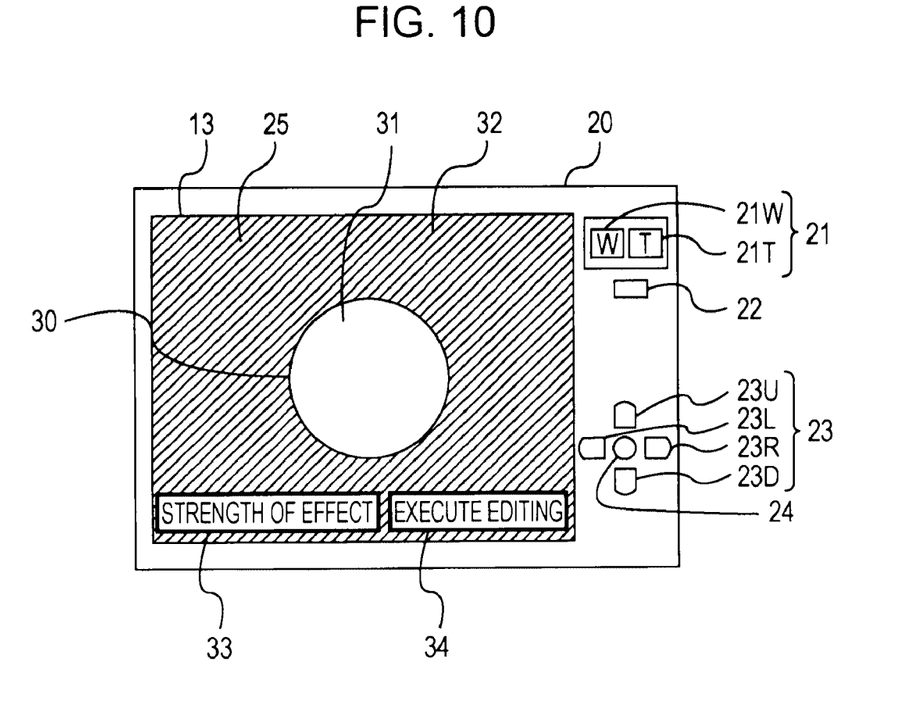
FIG. 10 illustrates a display example of an icon indicating strength of an effect according to an embodiment of the present invention.
Figure 11:
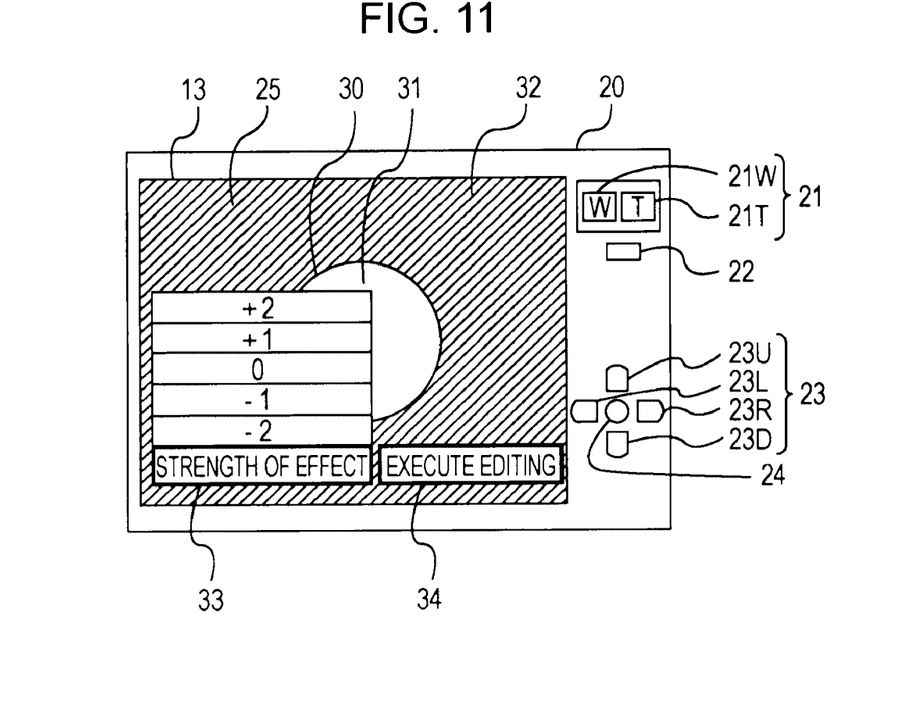
FIG. 11 illustrates a display example of an icon specifying strength of effects according to an embodiment of the present invention.

When the specification of the size of the image editing area is completed, as shown in FIG. 10, a "strength of effect" button 33 displayed by an icon on the screen 25 of the LCD 13 and a similar "execute editing" button 34 are displayed. Here, when the cursor is moved on the "strength of effect" button 33 by operating the cross key 23 and the decision key 24 is pressed, the strength of effect set to have several steps in advance as shown in FIG. 11 is shown. The user selects desired strength of effect from the several steps of strength of effect by operating the cross key 23 (step S6). For example, if the cursor is moved on a desired strength of effect, for example "+1" by the cross key 23, and then after the elapse of a certain no-operation time, a determination is automatically made, the trouble of pressing the decision key 24 can be omitted, resulting in better operationality.

In this regard, after the completion of the specification of the position of the editing area by the cross key 23 in the above-described step S4, in FIG. 7, the "strength of effect" button 33 may be displayed together with the frame 30 on the image 25. In this case, after the image editing area 31 on the image 25 is specified by the cross key 23, a software key for adjusting the strength of image effect is displayed together with the frame 30 with being superimposed on the image 25 on the LCD 13. Before specifying a range of editing area, it becomes possible for the user to specify the strength of the image effect, and the image processing section 4 adjusts the strength of the image effect on the image editing area 31 on the basis of the instruction from the cross key 23 through the software key. In this manner, by assigning the key function specifying the strength of the image effect to the cross key 23 in addition to the key function of specifying a type of image effect and a function of specifying the position of the image editing area, and by appropriately changing these key functions, it is possible to efficiently use a limited number of operation keys of the digital still camera 20, thereby reducing the number of operation keys.

On the LCD 13 after a type of image effect shown in FIGS. 7 to 11, the image, which has been subjected to the image effect on the image editing area 31 of the image 25, is displayed on the LCD 13 in real time (immediately). In this case, it is possible for the user to perform editing while checking the image after the image processing, and thus it is possible to provide the user with an intuitive and easily understandable editing environment. Of course, only the frame 30 may be displayed on the image 25 without achieving an image effect in real time on the image editing area 31.

After specifying the strength of effect, the user operates the cross key 23 to move the cursor on the "execute editing"

button 34, and presses the decision key 24. Thereby, the image processing on the image editing area 31 is executed. That is to say, under the control of the CPU 2, which has received a signal from the decision key 24, the image file read from the internal recording medium 3 is stored into the external recording medium 11 through the media processing section 10 (step S7). When the processing of step S7 is completed, the CPU 2 terminates the editing processing.

Figure 12:
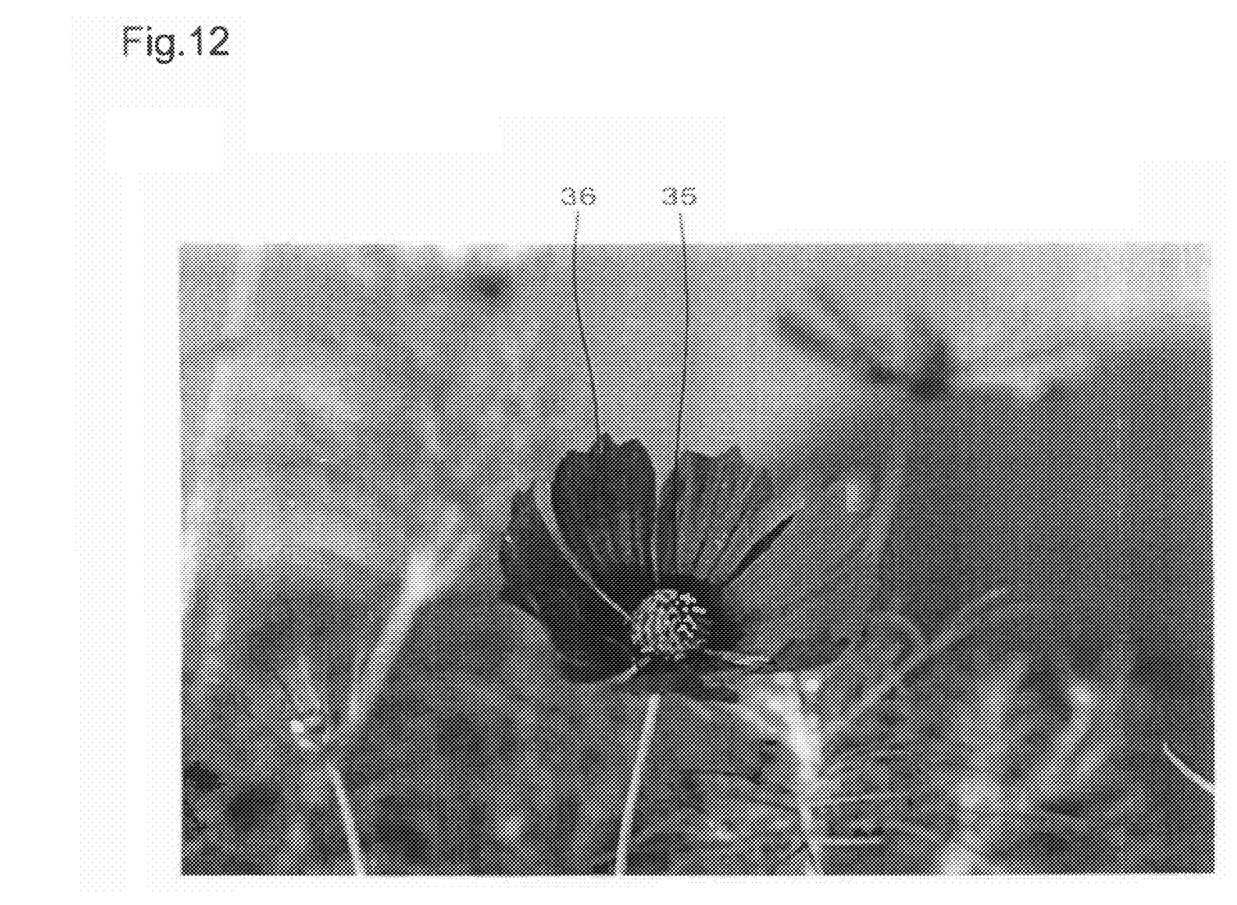
FIG. 12 illustrates an example of an image display before editing according to an embodiment of the present invention.
Figure 13:
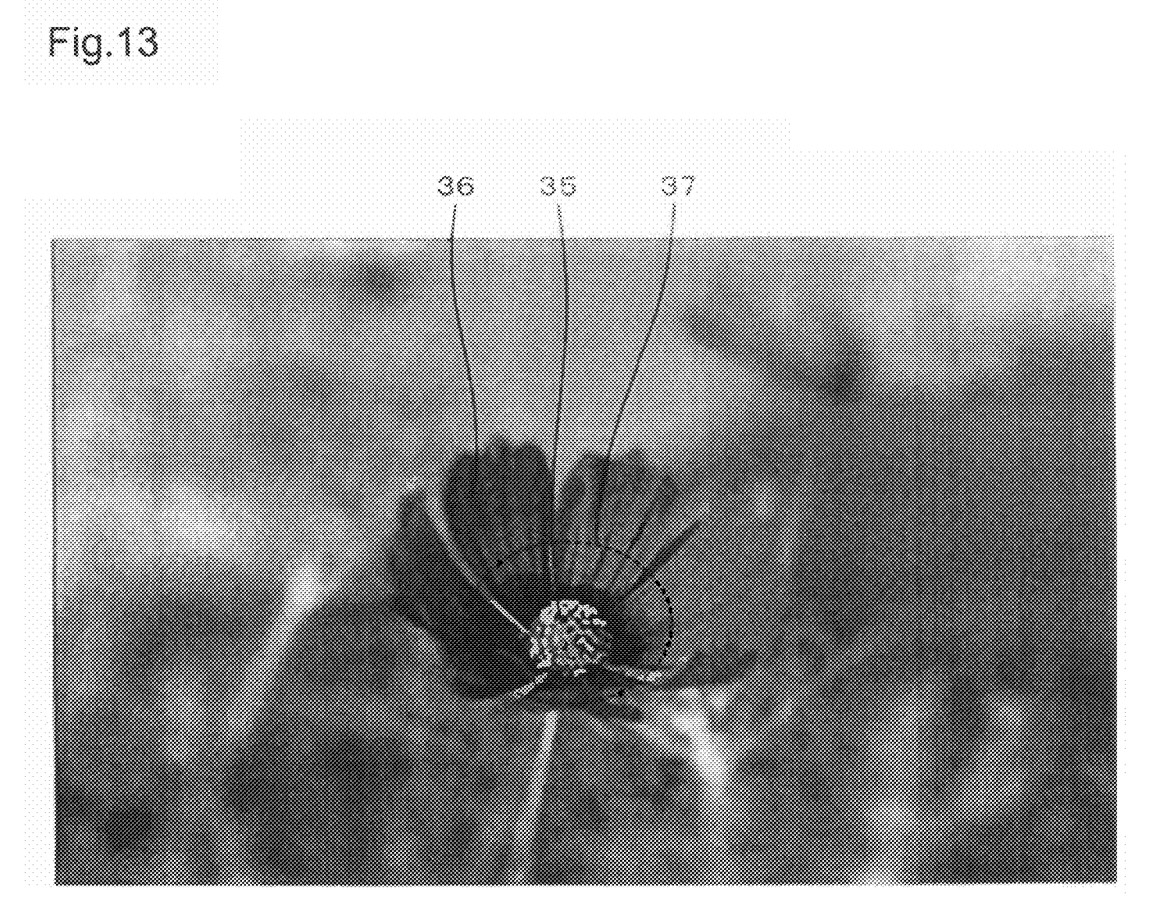
FIG. 13 illustrates an example of an image display after editing (blurring) according to an embodiment of the present invention.

FIGS. 12 and 13 show an example of display of a cosmos before editing and an example of display of the cosmos after editing, respectively. In this example, blurring is performed as an image effect. A cosmos is formed by gathering many small flowers called tubular flowers, and such a flower shape is called a capitulum. The entire flower formed by gathering small flowers is called an anthodium. The parts look like petals around anthodia 35 are ligulate flowers 36 that have changed from tubular flowers. In FIG. 12, the focus of the digital camera is placed on a cosmos in the center, and the portion other than the cosmos in the center is out of focus on the whole. In contrast, for the cosmos in FIG. 13, which has been subjected to blurring processing, the anthodia 35 inside the frame 37 and the surroundings thereof are an unprocessed image. However, the image editing area outside the frame 37 has been subjected to the blurring processing and is a blurred image, which is more than just being out of focus.

As described above, by an embodiment of the present invention, the specification of the image editing area in the image editing function of the digital still camera 20 is carried out by the zoom keys 23, and thus it is possible to provide operationality which is intuitive and very easy to understand for the user. Accordingly, the user-friendliness is improved. The zoom keys 23 are not used at the time of reproducing images, and thus it is possible to achieve the functions without interfering with the operations other than image editing.

Also, the assignment of functions to one key (the cross key 23) can be appropriately changed, that is to say, the image-effect specification function on the image 25, the image-editing area position specification function, and the image-effect strength specification function can be appropriately changed to the cross key 23. Accordingly, the operation keys disposed in a limited space are reduced.

In this regard, in the above-described embodiment, a description has been given of an embodiment of an imaging apparatus by taking a digital still camera as an example. However, the present invention is not limited to this, and can be applied to a so-called camcorder in which an image capturing section and a recording section are integrated. When the present invention is applied to a camcorder, the editing method of the present invention can be used for either of a still image or a moving image. Furthermore, it is also possible to apply the present invention to a mobile terminal unit, etc., having an imaging function.

Also, in the above-described embodiment, the frame 30 indicating the image editing area 31 is displayed on the LCD 13. However, it is not necessary to display this frame 30. For example, if the difference between the image editing area and the image non-editing area in the vicinity of the border of the frame 30 is obvious, it is possible to easily recognize the area on which the image effect is produced without displaying the frame 30.

Also, in the above-described embodiment, the image editing area 31 and the image non-editing area 32 are separated by the frame 30 (refer to FIG. 7). However, the present invention is not limited to this. For example, the image effect may be produced gradually or step by step on the image non-editing area 32 from the frame 30 as a starting position.

Also, the software functions of the above-described embodiment may be recorded in a recording medium as program code, and may be supplied to a system or an apparatus. The computer (or controller, such as a CPU, etc.) of the system or the apparatus may read and execute the program code stored in the recording medium to achieve the functions as a matter of course.

Also, in this specification, the steps describing the programs stored in the ROM include the processing to be performed in time series in accordance with the described sequence as a matter of course. Also, the steps include the processing which is not necessarily executed in time series, but is executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    an image-effect specification section specifying a type of image effect to be produced on an image data displayed in a display section;
    a scaling operation section specifying expansion and contraction of the image data displayed in the display section and specifying a range of an image edit area on the displayed image data; and
    an image processing section performing image processing on the image edit area specified by the scaling operation section in accordance with the specification from the image-effect specification section to modify the image data within the range of the image edit area based on the type of image effect and to maintain original image data outside the range of the image edit area to generate a modified image including both modified image data within the range and the original image outside the range.

2. The image processing apparatus according to claim 1, further comprising:
    a storage instruction section instructing to store the modified image.

3. The image processing apparatus according to claim 2, wherein the storage section stores the modified image data into a different storage section from the original image data.

4. The image processing apparatus according to claim 1, wherein a frame line of the image edit area specified by the scaling operation section is displayed on the image data displayed in the display section.

5. The image processing apparatus according to claim 1, further comprising:
    an edit-area position specification section specifying a position of an image edit area on the image data displayed in the display section.

6. The image processing apparatus according to claim 5, wherein after the position of the image edit area on the image data is specified by the edit-area position specification section, a function of specifying a strength of the image effect is assigned to the edit-area position specification section, and the image effect is produced on the image edit area of the image data on the basis of the strength of the image effect specified by the edit-area position specification section.

7. The image processing apparatus according to claim 5, wherein after the position of the image edit area on the image data is specified by the edit-area position specification section, a software key for allowing a user to select the strength of the image effect to perform stepwise adjustment is displayed by being superimposed on the image data in the display section, and the image processing section produces image effect on the image edit area of the image data on the basis of the strength of the image effect specified by the edit-area position specification section through the software key.

8. The image processing apparatus according to claim 5, wherein the edit-area position specification section is a direction specification key.

9. A method of editing an image, comprising:
- displaying image data in a display section;
- specifying a type of image effect to be produced on the image data displayed in the display section by an image-effect specification section;
- specifying a range of an image edit area on the displayed image data by a scaling operation section capable of specifying a scaling on the displayed image data by the display section;
- performing image processing, using a processor, on the image edit area specified by the scaling operation section in accordance with the specification from the image-effect specification section to modify the image data within the range of the image edit area based on the type of image effect and to maintain original image data outside the range of the image edit area to generate a modified image including both modified image data within the range and the original image outside the range; and
- displaying the modified image.

10. A non-transitory computer readable medium encoded with a program that causes a computer to perform a method comprising:
- displaying image data in a display section;
- specifying a type of image effect to be produced on the image data displayed in the display section by an image-effect specification section;
- specifying a range of an image edit area on the displayed image data by a scaling operation section capable of specifying a scaling on the displayed image data by the display section;
- performing image processing, using a processor, on the image edit area specified by the scaling operation section in accordance with the specification from the image-effect specification section to modify the image data within the range of the image edit area based on the type of image effect and to maintain original image data outside the range of the image edit area to generate a modified image including both modified image data within the range and the original image outside the range; and
- displaying the modified image.

11. The image processing apparatus according to claim 1, wherein the type of image effect is one of blurring, a mosaic effect, and converting to black-and-white.

12. The image processing apparatus according to claim 1, wherein the image edit area is a circle.

13. The image processing apparatus according to claim 1, wherein the image edit area is a triangle.

14. The image processing apparatus according to claim 1, further comprising:
- an image effect strength receiving unit configured to receive from a user a value specifying a strength of the image effect is assigned to the edit-area position specification section, and the image effect is produced on the image edit area of the image data on the basis of the strength of the image effect such that a greater value of the strength provides a greater modification of the image data by the image effect.

* * * * *